United States Patent [19]

Halstead et al.

[11] Patent Number: 5,328,084
[45] Date of Patent: Jul. 12, 1994

[54] ALUMINUM HEAT EXCHANGER BRAZE FURNACE

[75] Inventors: Gary A. Halstead; Brian L. Barten, both of Lockport, N.Y.

[73] Assignee: General Motors Corporation, Detroit, Mich.

[21] Appl. No.: 878,242

[22] Filed: May 4, 1992

[51] Int. Cl.⁵ .............................................. B23K 1/00
[52] U.S. Cl. ...................................... 228/18; 228/43; 228/183; 228/220; 432/128; 432/176; 432/206; 432/209
[58] Field of Search ............... 432/161, 175, 176, 202, 432/206, 209, 128; 228/18, 43, 183, 220

[56] References Cited

U.S. PATENT DOCUMENTS

| | | | |
|---|---|---|---|
| 2,889,615 | 6/1959 | Stalker | 29/156.8 |
| 3,456,331 | 7/1969 | Holden | 29/471.1 |
| 3,769,675 | 11/1973 | Chartet | 228/44.1 R |
| 3,807,943 | 4/1974 | McKinstry | 432/209 |
| 3,882,596 | 5/1975 | Kendaiora et al. | 228/200 |
| 3,941,293 | 3/1976 | Chartet | 29/157.3 R |
| 3,982,887 | 9/1976 | Kendziora et al. | 432/128 |
| 4,219,324 | 4/1980 | Zahniser | 432/209 |
| 4,729,735 | 3/1988 | Ross | 432/176 |
| 4,785,552 | 11/1988 | Best | 34/30 |
| 4,846,675 | 7/1989 | Soliman | 432/206 |
| 4,906,182 | 3/1990 | Moller | 432/176 |
| 5,195,673 | 3/1993 | Irish et al. | 228/18 |

FOREIGN PATENT DOCUMENTS 0109892 11/1983 European Pat. Off. .
3739073 7/1988 Fed. Rep. of Germany .
1592540 7/1981 United Kingdom .

*Primary Examiner*—Henry C. Yuen
*Attorney, Agent, or Firm*—Ronald L. Phillips

[57] ABSTRACT

A muffle furnace assembly for brazing aluminum heat exchanger workparts comprises a tubular muffle having a workpart conveyer extending therethrough. A pair of fans disposed inside the muffle circulate high temperature atmosphere through the workparts. The muffle is surrounded by an insulative outer shell spaced to form an interstitial cavity therebetween. High temperature combustion gasses are directed into the interstitial cavity and flow in a helical path about the muffle. Louvers are provided in the muffle, between the workparts and the fans, for regulating the amount of inert gas flow within the muffle. Inlet and exit vestibules usher workparts into and out of the furnace assembly to minimize oxygen contamination within the muffle.

1 Claim, 4 Drawing Sheets

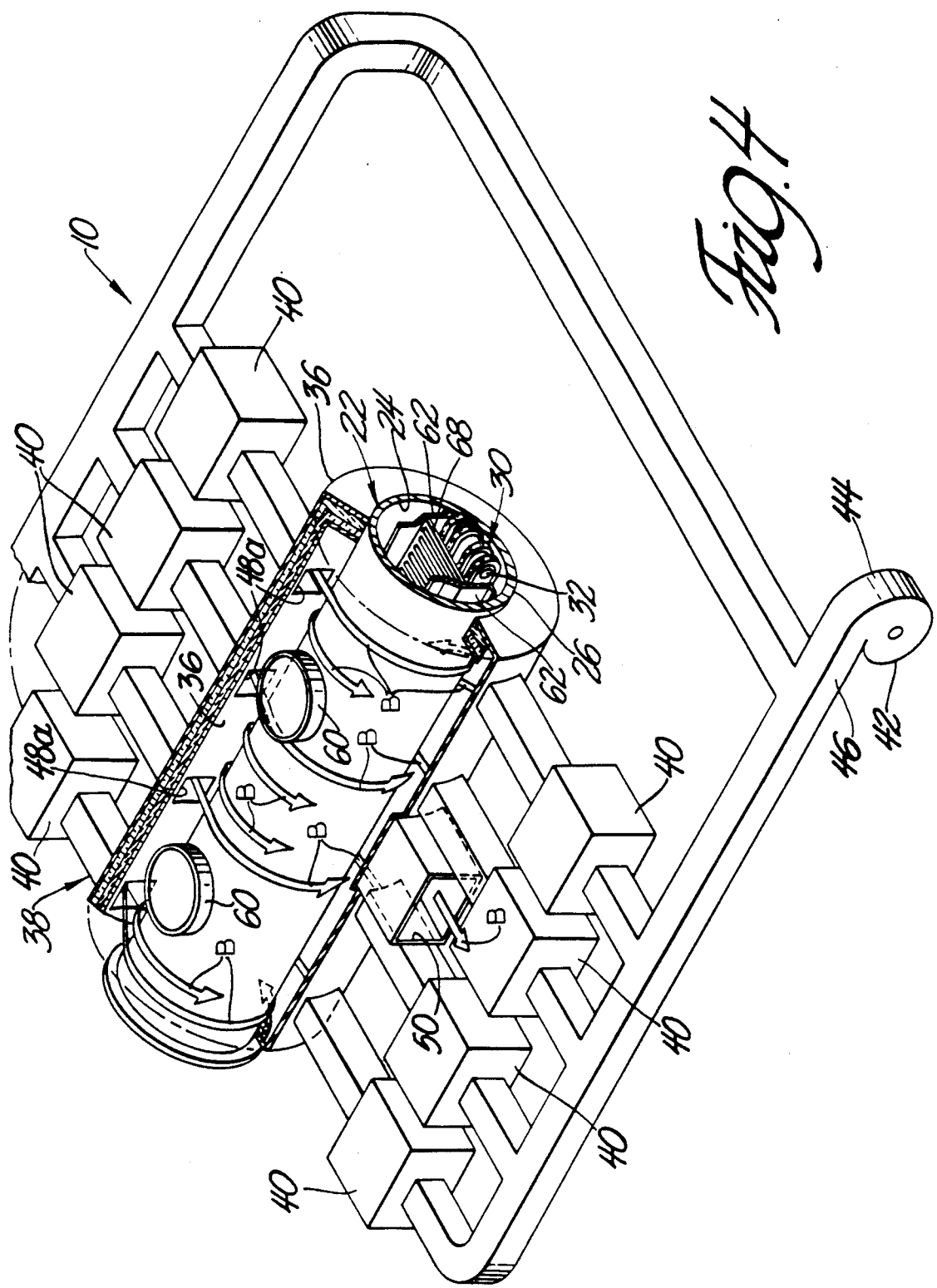

ALUMINUM HEAT EXCHANGER BRAZE FURNACE

TECHNICAL FIELD

The subject invention relates to a furnace assembly for brazing aluminum heat exchanger workparts, and more particularly to a muffle type furnace wherein workparts are conveyed through an externally heated tubular muffle.

BACKGROUND ART

Braze furnaces are well known in the prior art for brazing aluminum heat exchanger workparts. The most common method of brazing such workparts according to the prior art includes conveying the workparts through a tubular muffle in which is established an isolated internal braze zone containing a braze conducive atmosphere. This braze conducive atmosphere is substantially devoid of oxygen to increase the size of the braze fillets and generally provide improved braze results. A conveyer means extends through the tubular muffle for conveying workparts through the braze zone. A radiation inducer means, typically an electric resistance wire, is disposed about the exterior of the muffle for heating the muffle to emit radiant heat energy into the braze zone. The muffle and radiation inducer means are surrounded by an outer insulative shell to reduce thermal loss. In this manner, the muffle is heated entirely by the external electric resistance wire, and radiates this heat to the workparts conveyed internally through the muffle. Such muffles are made sufficiently long and/or the conveyor means sufficiently slow enough so that complete brazing is accomplished prior to the workparts exiting the muffle.

These prior art muffle furnaces are deficient in that the electrical resistance wire, by nature, is slow to heat the massive muffle furnace to brazing temperatures, e.g., 1100° F. to 1200° F. Because of this slow heating of the muffle, efficiency dictates that the furnace be maintained at operating temperatures 24 hours per day, with workparts being passed through on a nearly continuous basis for energy conservation. Thus, for very small production runs, test runs, etc., the prior art muffle furnaces are very uneconomical.

Also, because the prior art muffle furnaces are generally quite long to allow the full and complete brazing of workparts conveyed therethrough, a significant amount of floor space is occupied by the furnace assembly. Because of the very long muffle furnace, it is more difficult to control atmosphere leaks and oxygen infiltration into the isolated internal braze zone. Other disadvantages naturally resulting from the extended length of the prior art muffle furnace include the increased thermal expansion and contraction of the muffle. Also, the long muffles of the prior art muffle furnaces require a correspondingly long conveyer means extending the length thereof, which translates into larger drive motors and the like to drive the conveyor means.

These and other disadvantages of the prior art muffle furnaces indicate a need for a braze furnace assembly which is shorter in length and more quickly heated to a brazing temperature so that small production runs and test runs may be carried out with efficiency.

SUMMARY OF THE INVENTION AND ADVANTAGES

The subject invention comprises a muffle furnace assembly for brazing heat exchanger workparts. The assembly includes a tubular muffle means for establishing an isolated internal braze zone containing a braze conducive atmosphere, a conveyor means for conveying a workpart through the braze zone of the muffle, and a radiation inducer means disposed about the exterior of the muffle means for heating the muffle means to emit radiant heat energy into the braze zone. The improvement of the subject invention comprises a convection means disposed in the braze zone for circulating the atmosphere within the brace zone to accelerate heat transfer from the muffle means to the workpart.

The subject invention overcomes the disadvantages of the prior art by providing the convection means which circulates the braze conducive atmosphere within the muffle means so that convective heat transfer is utilized to rapidly heat the workparts therein, in addition to the radiant heat energy emitted from the muffle means. Because the convection means of the subject invention accelerates heat transfer between the radiation inducer means and the workparts, the muffle means may be considerably shorter than that required by the prior art, thereby reducing the required floor space of the muffle furnace assembly, decreasing the chance of oxygen infiltration, reducing the amount of thermal expansion experienced by the muffle means, and reducing the weight and power required to drive the shorter conveyor means. Also, because the subject muffle furnace assembly is quicker to heat to operating temperature than the prior art muffle furnaces, the need for the furnace assembly to run 24 hours per day is eliminated thereby making small production runs and test runs more economical.

According to another aspect of the subject invention, an outer shell is spaced outwardly from the muffle means for forming an interstitial cavity therebetween. In this instance, the radiation inducer means forcibly circulates high temperature fluid within the interstitial cavity to rapidly and evenly heat the muffle means. According to this aspect, the circulating high temperature fluid within the interstitial cavity overcomes the inherent disadvantages of the prior art electrical resistance wires by more rapidly heating the muffle means. Thus, all of the disadvantages exhibited by the slow heating characteristics of the prior art are overcome with the forcible circulation of high temperature fluid within the interstitial cavity.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a simplified isometric view of the subject muffle furnace assembly shown in partial cross-section.

DETAILED DESCRIPTION OF THE PREFERRED EMBODIMENT

Figure 1:
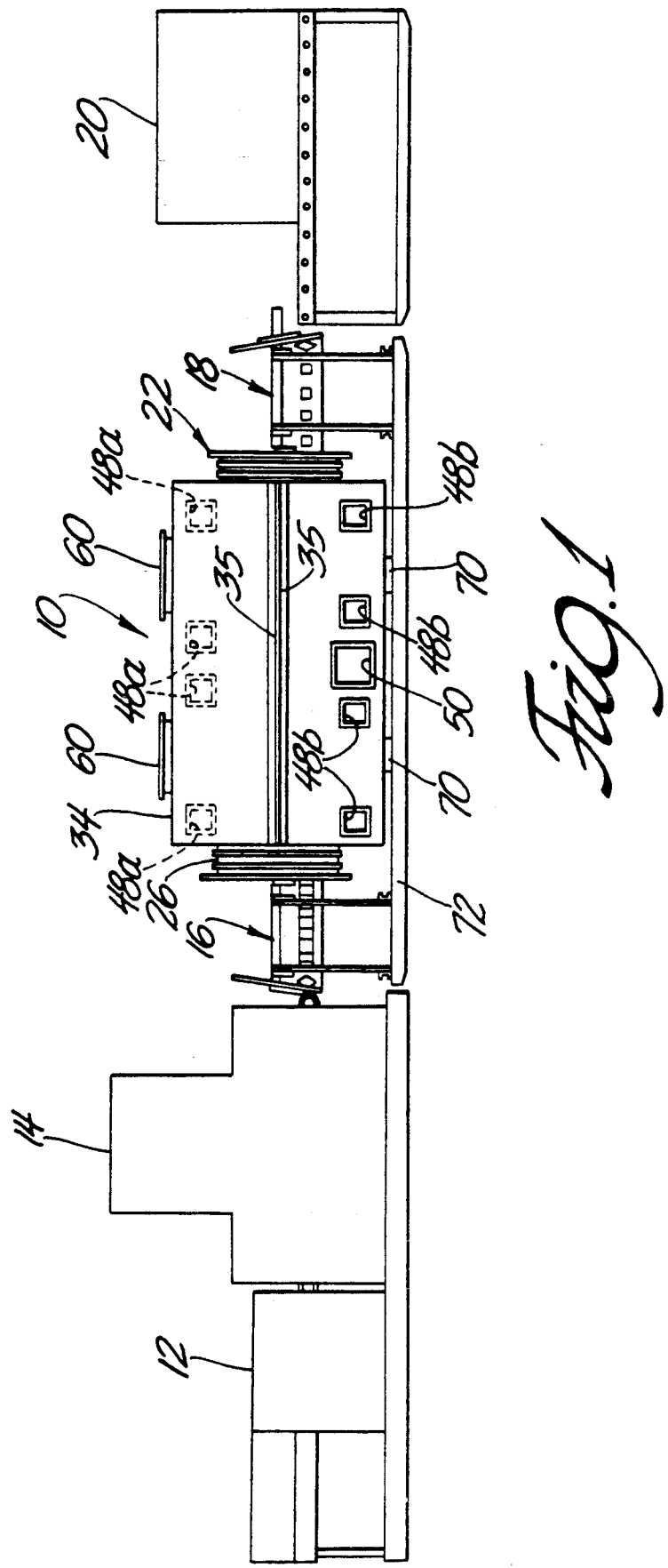
FIG. 1 is a front elevation view of a muffle furnace assembly according to the subject invention disposed for operation along the assembly line of an aluminum heat exchanger fluxing, drying, brazing, and cooling apparatus.

Referring to the Figures, wherein like numerals indicate like or corresponding parts throughout several views, a muffle furnace assembly according to the subject invention is generally shown at 10. The assembly 10 is of the type for brazing aluminum heat exchanger workparts for use primarily in automotive applications. As shown in FIG. 1, the assembly 10 is operated in concert with other assemblies on a production line type basis to yield a continuous outflow of brazed heat exchangers.

Specifically, the heat exchanger brazing assembly line includes a fluxer 12 where unbrazed heat exchanger workparts are bathed in an aqueous flux material as well known in the art. While disposed on a conveyor drive mechanism (not shown), the workparts are conveyed from the fluxer 12 into a drying oven 14 where the vehicle of the aqueous flux solution is driven off thereby leaving the residual flux material completely coating the workparts. From the drying oven 14, the partially heated workparts are conveyed into an inlet vestibule, generally indicated at 16, for receiving the fluxed workparts in interlock chamber fashion and surrounding them with a braze conducive atmosphere prior to transferring the workparts into the furnace assembly 10. Once the workparts are completely surrounded by the braze conducive atmosphere, i.e., the majority of oxygen is driven off and replaced with an atmosphere inert to the flux and braze material, e.g., nitrogen, the workparts are transferred from the inlet vestibule 16 to the furnace assembly 10 wherein high temperatures first melt the flux to clean and prepare the joints for braze, and then liquify the braze material to bond the pieces of the workparts together. A driven roller conveyor section is provided in the inlet vestibule 16 for rapidly moving the workparts into the furnace assembly 10 so that an access door 17 to the furnace assembly 10 is only open for a very short period of time.

The workparts thus brazed are transferred from the furnace assembly 10 through an outlet door 19 to an exit vestibule, generally indicated at 18, to prevent oxygen contamination of the braze conducive atmosphere within the furnace assembly 10. Like the inlet vestibule 14, the exit vestibule 18 is also provided with a driven roller conveyor section. From the exit vestibule 18, the workparts are transferred to an air blast cooler 20 for reducing the temperature of the workparts and completely solidifying the braze material. The workparts emerge from the air blast cooler 20 finished and ready for use.

Figure 2:
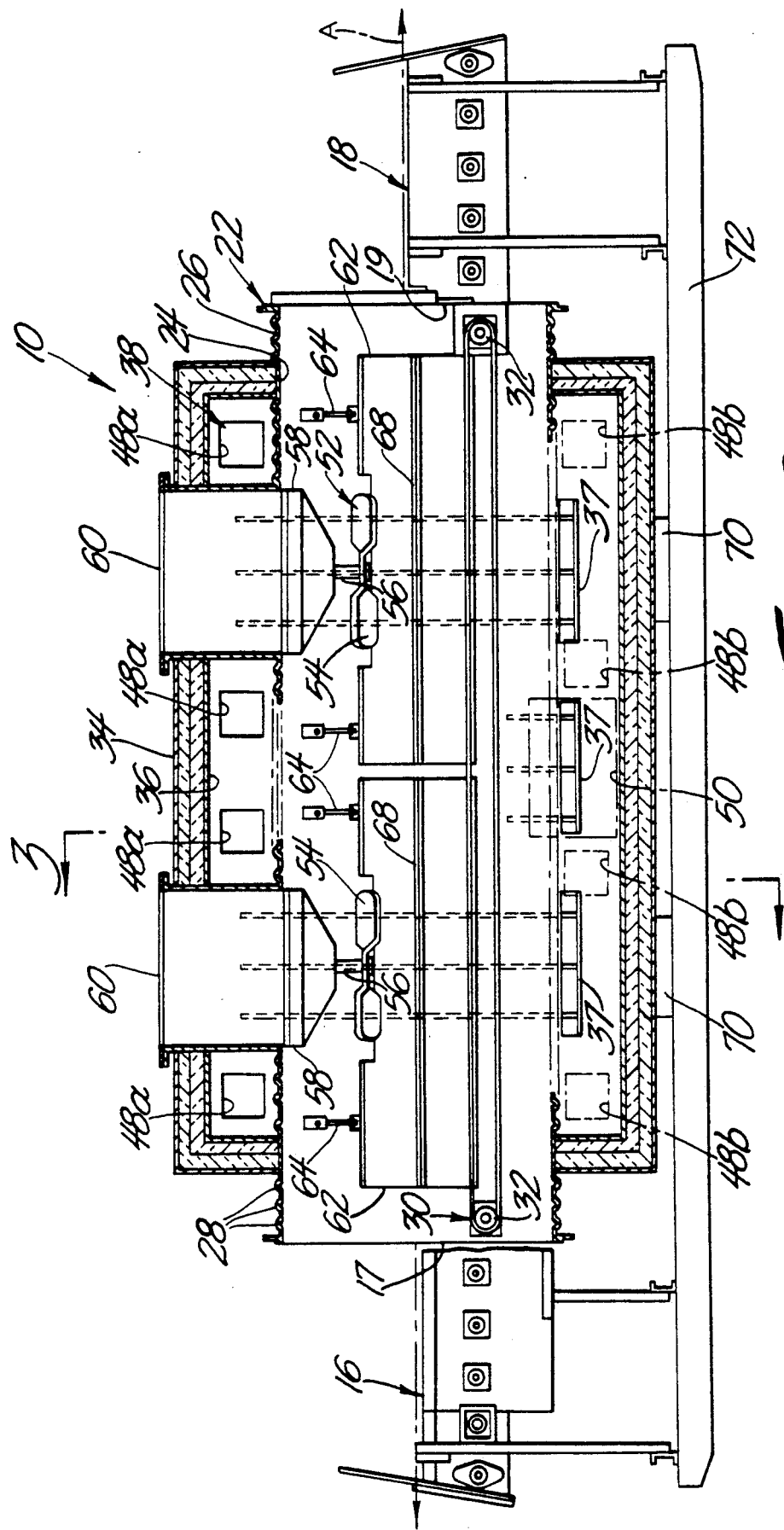
FIG. 2 is a partial cross-sectional front view of the subject muffle furnace assembly.

The furnace assembly 10 is best shown in FIG. 2 including a tubular muffle means, generally indicated at 22, for establishing an isolated internal braze zone 24 containing a braze conducive atmosphere. The muffle means 22 extends along a central axis A and comprises a thin-walled cylindrical tube 26 having plurality of annular expansion ribs 28 disposed along the length thereof. According to the preferred embodiment, the tube 26 has an internal diameter of approximately three (3) feet generally continuous along its entire length.

A conveyer means, generally indicated at 30, is disposed within the tube 26 for conveying workparts through the braze zone 24 of the muffle means 22. Preferably, the conveyor means 30 includes a plurality of side-by-side double pitch roller chains supported on opposite ends by spaced sprockets 32 in the typical manner. Although not shown, it is to be understood that the attendant support channels and chain guides typical of prior art conveyors of this type are also included to adequately support the workparts along the entire length of the muffle means 22.

An outer shell 34 is disposed about the exterior of the muffle means 22 for forming an interstitial cavity 36 therebetween. Preferably, the outer shell 34 is composed of a very thick insulative material, generally on the order of six (6) inches thick. The outer shell 34 is fabricated in two half-shell sections joined together along mating flanges 35. The outer shell 34 is disposed cylindrically about the muffle means 22 and has a slightly shorter length than the muffle means 22, as shown in FIG. 2, so that the ends of the tube 26 extend outwardly from the outer shell 34 a short distance, thus permitting convenient maintenance of the conveyor means 30 via the support sprockets 32. Bracket-like support members 37 extend within the interstitial cavity 36 between the outer shell 34 and the tube 26 to securely support the tube 26 in place.

A radiation inducer means, generally indicated at 38, FIG. 4, is provided for forcibly circulating a high temperature fluid within the interstitial cavity 36 and thereby heating the muffle means 22 to emit radiant heat energy into the braze zone 24. The radiation inducer means 38 directs high temperature combustion gasses through the interstitial cavity 36 to convectively heat in a rapid and evenly distributed manner the tube 26 of the muffle means 22. The radiation inducer means 38 includes a combustion means 40 for producing a high temperature fluid such as by burning a liquid or gaseous fuel in the presence of oxygen. The combustion means 40 is schematically represented in FIG. 4, however, may comprise any means for producing high temperature fluid well known in the art. However, the preferred mode of operation requires eight discrete flame combustion units located immediately upstream of the interstitial cavity 36.

The radiation inducer means also includes a circulation means 42 for circulating the high temperature fluid from the combustion means 40 within the interstitial cavity 36. The circulation means 42, more specifically, comprises a blower type fan 44 in combination with a duct work system 46 communicating with the eight discrete flame combustion units of the combustion means 40 to convey the high temperature fluid from a point exterior of the outer shell 34 into the interstitial cavity 36. Thus, the duct work 46 extends from the blower fan 44 in parallel flow fashion to a plurality of high temperature fluid inlets 48a, 48b extending through the outer shell 34 in strategically located at positions to deliver the forced flow of high temperature fluid into the interstitial cavity 36.

Figure 3:
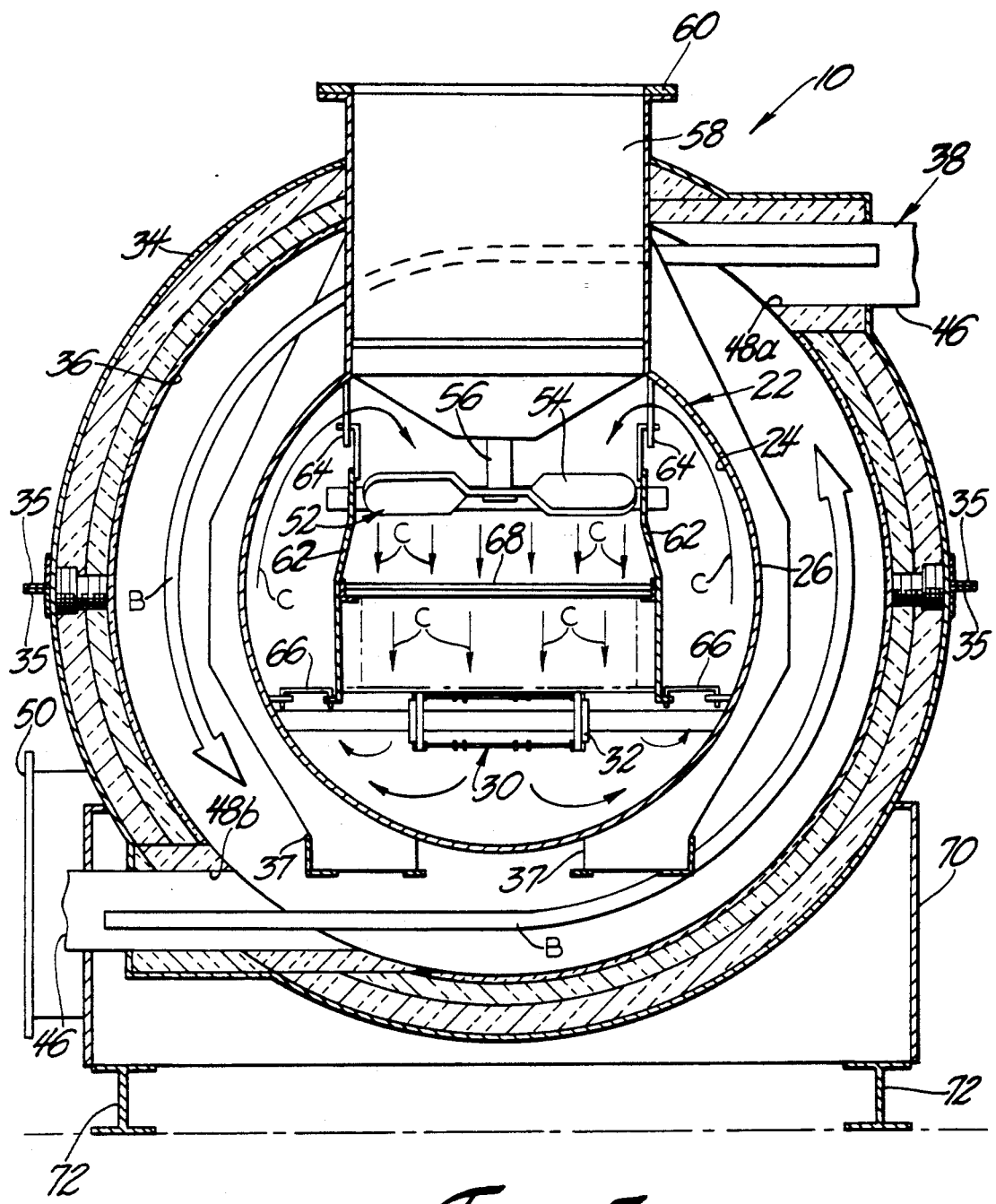
FIG. 3 is a cross-sectional view taken substantially along lines 3—3 of FIG. 2.

The inlets 48a, 48b are arranged so as to direct the circulating high temperature fluid in a generally helical flow path about the muffle means 22, as shown by the flow arrows B in FIGS. 3 and 4. More particularly, a plurality of upper inlets 48a direct the high temperature fluid generally tangentially into the upper most region of the interstitial cavity 36. Similarly, a plurality of lower inlets 48b direct the forced high temperature fluid generally tangentially into the lower most region of the interstitial cavity 36. In this manner, the upper 48a and lower 48b inlets are diametrically opposed to one another and interject the flowing high temperature fluid in a swirling, scrubbing motion about the tube 26. One centrally located fluid outlet 50 is provided, as best shown in FIG. 4, extending through the outer shell 34. Because of the relationship between the inlets 48a, 48b and the single outlet 50, the flowing high temperature fluid is forced to move in a helical flow path toward the single outlet 50. Therefore, as near as possible, every portion of the exterior of the tube 26 is exposed to the convective heat transfer effects of the flowing high temperature fluid.

A convection means, generally indicated at 52 in FIGS. 2-3, is disposed in the braze zone 24 for circulating the atmosphere within the braze zone 24 to accelerate heat transfer from the muffle means 22 to the workpart. Thus, as heat energy is transferred via conduction through the tube 26, the convection means 52 creates a circulation in the braze conductive atmosphere within the muffle means 22 to accelerate heat transfer from the tube 26 to the workpart by use of convection. The convection means 52, includes a pair of fans 54 rotatably supported within the braze zone 24. The fans 54 are spaced axially from one another and each are supported on a rotary shaft 56 turned by a motor 58. The fan motors 58 are located in respective fan towers 60 extending upwardly from the tube 26, through the interstitial cavity 36 and the outer shell 34, to a termination exterior of the outer shell 34. Each of the fan towers 60 are completely sealed against oxygen infiltration into the braze zone 24 so that the braze conductive atmosphere may be maintained therein.

The fans 54 are respectively disposed for rotation between two flanking shrouds 62 suspended from above by hanging brackets 64 and supported on the sides by lateral brackets 66. The two shrouds 62 extend downwardly from opposite sides of the fans 54 to a termination adjacent the upper most conveying surface of the conveyor means 30. In this manner, atmosphere pushed downwardly by the rotating fans 54 is directed fully toward the workparts disposed on the conveyor means 30 as shown by the arrows C representative of atmosphere flow in FIG. 3. The downwardly thrusting atmosphere passes through the workparts and the conveyor means 30 and is directed back upwardly between the tube 26 and the exterior surfaces of the shrouds 62, as shown by the flow arrows C in.

Flow control louvers 68 are disposed between the pair of lateral louvers 62 and also between the workparts and the fans 54. The louvers 68 include a plurality of closely spaced elongated oval slots extending generally perpendicular to the axis of the muffle means 22. A plate having identically corresponding elongated oval openings is slidably disposed to close off or fully open up the air flow through the louvers 68 in well known fashion. As shown in FIG. 2, the louvers 68 are separately adjustable for the respective fans 54 so that the atmosphere flow within the muffle means 22 may be more precisely controlled. In an alternative construction (not shown), the louvers 68 may be adjusted collectively.

The furnace assembly 10 is supported above the ground on a pair of stanchions 70 extending downwardly to a pair of I-beam skids 72. In operation, freshly fluxed workparts are received from the drying oven 14 into the inlet vestibule 16 where doors on opposite ends of the inlet vestibule 16 are closed and the atmosphere therein purged of oxygen. Thence, the workparts are transferred into the muffle means 22 through the access door 17 wherein the high temperature circulating fluid rapidly raises the temperature of the workpart to the liquification temperature of the flux, and then the liquification temperature of the braze material so that the disjointed parts of the workpart become fused together by the braze material. Throughout transfer of the workparts through the muffle means 22, the fans 54 continuously distribute and circulate the braze conducive atmosphere within the tube 26 thereby accelerating the heat transfer from the heated tube 26 to the workparts by convection. If necessary to maintain the proper braze conducive atmosphere, Nocolok ™ flux capsules can be dropped into a cup (not shown) inside the braze zone 24 through a tube chute (not shown) to aid in oxygen removal by boiling off HF at temperatures above 1040° F. Upon exiting the muffle means 22, the workparts are transferred to the exit interlock chamber 18 where the workparts are maintained in a braze conducive atmosphere until the outlet door 19 of the muffle means 22 is closed. Thereafter, the workpart is transferred from the exit vestibule 18 to the air blast cooler 20 to completely solidify the braze material and complete the braze operation.

The subject invention overcomes the disadvantages of the prior art in that the muffle means 22 is rapidly heated to the operational temperature by the scrubbing effect of the circulating high temperature gasses within the interstitial cavity 36. This rapid heating to the operational temperature eliminates the need to maintain the furnace assembly 10 at an operational temperature 24 hours per day, and also permits the economical use of the furnace assembly 10 for small production runs, test runs, and other low volume work. Also, because the workparts are more rapidly heated to the braze liquification temperature by way of the convection means 52, the entire furnace assembly 10 may be shorter than that required by the prior art, thereby saving valuable floor space, reducing the required weight of the conveyor means 30, and reducing the amount of thermal expansion.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

It is claimed:

1. A muffle furnace assembly for brazing heat exchanger workparts, said assembly comprising:
   cylindrical muffle means extending along a central axis for establishing an isolated internal braze zone containing a braze conducive atmosphere;
   conveyor means for conveying a workpart longitudinally of said axis through said braze zone;
   an outer shell spaced outwardly from said muffle means for forming an interstitial cavity disposed concentrically about said muffle means;
   radiation inducer means for forcibly circulating high temperature fluid within said interstitial cavity and heating said muffle means to emit radiant heat energy rapidly and evenly into said braze zone; and
   a high temperature fluid inlet extending through said outer shell and openly communicating with said interstitial cavity along an inlet path generally tangential to said interstitial cavity.

* * * * *